(12) United States Patent
Watchman

(10) Patent No.: US 11,820,687 B2
(45) Date of Patent: Nov. 21, 2023

(54) SYSTEM AND METHOD FOR TREATING EFFLUENT

(71) Applicant: BAYER AKTIENGESELLSCHAFT, Leverkusen (DE)

(72) Inventor: Dale Andrew Watchman, Indian Head (CA)

(73) Assignee: Bayer Aktiengesellschaft, Leverkusen (DE)

( * ) Notice: Subject to any disclaimer, the term of this patent is extended or adjusted under 35 U.S.C. 154(b) by 62 days.

(21) Appl. No.: 17/051,344

(22) PCT Filed: Apr. 26, 2019

(86) PCT No.: PCT/EP2019/060693
§ 371 (c)(1),
(2) Date: Oct. 28, 2020

(87) PCT Pub. No.: WO2019/211177
PCT Pub. Date: Nov. 7, 2019

(65) Prior Publication Data
US 2021/0230031 A1 Jul. 29, 2021

(30) Foreign Application Priority Data
Apr. 30, 2018 (CA) ................ CA 3003220

(51) Int. Cl.
*C02F 3/00* (2023.01)
*C02F 3/04* (2023.01)
(Continued)

(52) U.S. Cl.
CPC ............... *C02F 3/006* (2013.01); *C02F 3/04* (2013.01); *C02F 3/105* (2013.01);
(Continued)

(58) Field of Classification Search
CPC .. C02F 3/04; C02F 3/006; C02F 3/046; C02F 3/105; C02F 3/106; C02F 2209/42;
(Continued)

(56) References Cited

U.S. PATENT DOCUMENTS

| 5,088,530 A | * | 2/1992 | Harp | ...................... B65D 90/24 141/86 |
| 5,194,147 A | * | 3/1993 | Augustine | ............... C02F 3/025 210/151 |
| 2004/0067160 A1 | * | 4/2004 | Perkins | .................... A23B 4/24 422/28 |

FOREIGN PATENT DOCUMENTS

| AU | 694085 B1 | 7/1998 |
| BE | 1010039 A5 | 12/1997 |

(Continued)

OTHER PUBLICATIONS

Liu et al, CN 103880257, English machine translation, pp. 1-9 (Year: 2015).*

(Continued)

*Primary Examiner* — Claire A Norris
(74) *Attorney, Agent, or Firm* — MCBEE MOORE & VANIK IP, LLC

(57) ABSTRACT

Systems and methods for treating liquid effluent, the effluent including contaminants capable of biodegradation, using biodegradation beds. While the effluent holding tank is housed within a containment facility in the event of holding tank rupture or leakage, the biodegradation beds and an excess effluent sump are housed adjacent but outside the containment facility. In some aspects, the biodegradation beds are covered with generally transparent covers to allow sunlight to heat the bed contents and effluent for degradation and evaporation purposes while avoiding introduction of unwanted ambient precipitation.

10 Claims, 3 Drawing Sheets

(51) Int. Cl.
  *C02F 3/10* (2023.01)
  *C02F 101/30* (2006.01)
  *C02F 101/32* (2006.01)
  *C02F 103/06* (2006.01)

(52) U.S. Cl.
  CPC .. *C02F 2101/301* (2013.01); *C02F 2101/306* (2013.01); *C02F 2101/32* (2013.01); *C02F 2103/06* (2013.01); *C02F 2209/42* (2013.01)

(58) Field of Classification Search
  CPC .......... C02F 2101/301; C02F 2101/306; C02F 2103/06; C02F 2103/44
  USPC ........................................ 210/621, 614, 615
  See application file for complete search history.

(56) References Cited

FOREIGN PATENT DOCUMENTS

| | | | |
|---|---|---|---|
| CH | 668252 A5 | 12/1988 | |
| CN | 103880257 B * | 9/2015 | |
| DE | 4237424 A1 | 5/1994 | |
| DE | 9406426 U1 | 8/1994 | |
| EP | 0426160 A1 * | 5/1991 | |
| WO | WO-2012034118 A2 * | 3/2012 | ............... B09C 1/10 |

OTHER PUBLICATIONS

International Search Report of International Patent Application No. PCT/EP2019/060693 dated Sep. 23, 2019.
"Werking van het phytoback system", Nov. 6, 2017, XP055604203.

* cited by examiner

SYSTEM AND METHOD FOR TREATING EFFLUENT

CROSS-REFERENCE TO RELATED APPLICATIONS

This application is a National Stage entry of International Application No. PCT/EP2019/060693, filed 26 Apr. 2019, which claims priority to Canadian Patent Application No. 3003220, filed 30 Apr. 2018.

BACKGROUND

Field

FIELD OF THE INVENTION

The present invention relates to treatment of contaminated liquid effluent such as phytosanitary effluent, and more specifically to treatment of cleaning liquids remaining after cleaning of agricultural implements.

Description of Related Art

It is known in the agricultural arts to apply phytosanitary treatment, such as for example organic pesticides, to crops for purposes such as the reduction of pest impact and avoidance of crop diseases. The treatment chemicals are applied to a standing crop by an implement designed for such purpose.

When the implement is afterwards cleaned with washing water, the generated effluent could pollute the soil and water near the washing area. Various prior art methods have been proposed for treatment of the effluent, such as for example evaporation or filtering and storage of the dry waste product. It has been found, however, that such methods are often relatively expensive and generate waste requiring specialized handling.

It is also known in the art to employ microorganisms to biodegrade effluent, in what is sometimes called a "biological bed" or "biobed". In one prior art method, a clay-covered pit is filled with a mixture of straw, soil and other organic material, with the microorganisms in the mixture acting to degrade the effluent upon introduction to the pit. In another biobed prior art method, described in French Patent Application No. 2896496 to Catroux et al., effluents are stored in a holding tank, pretreated to adjust acidity, and subsequently introduced into one or more biobeds for biodegradation through activation of microorganisms. However, the prior art methods may not adequately avoid environmental contamination, and in some cases where the biobed is covered by a roof the methods may suffer from inadequate evaporation of water in the effluent.

SUMMARY OF THE INVENTION

According to a first broad aspect of the present invention, there is provided a system for treating liquid effluent, the effluent comprising contaminants capable of biodegradation, the system comprising:
   a tank intake line for feeding the effluent to a holding tank;
   a containment facility for housing the holding tank;
   a tank outlet line for removing the effluent from the holding tank;
   a pump on the tank outlet line for pumping the effluent out of the holding tank;
   a line exit at a terminal end of the tank outlet line, the line exit positioned outside the containment facility;
   at least one biodegradation bed situated beneath the line exit and outside the containment facility, the at least one biodegradation bed configured for receipt of the effluent from the line exit, the at least one biodegradation bed comprising organic material and microorganisms, the organic material and microorganisms suitable for degrading the contaminants in the effluent as the effluent passes downwardly through the at least one biodegradation bed by gravity, thereby producing a treated stream;
   a bed outlet line for removing the treated stream from the at least one biodegradation bed; an overflow line for removing excess amounts of the effluent from the at least one biodegradation bed and directing the excess amounts to a sump tank positioned outside the containment facility; and
   an excess amounts reintroduction line for directing at least a portion of the excess amounts from the sump tank to the holding tank.

In some exemplary embodiments of the first aspect, the effluent comprises rinsate derived from washing agricultural implements. The contaminants may comprise phytosanitary treatment chemicals, surfactants, detergents, oils and/or organics. The containment facility may comprise containment features selected from the group consisting of a dyke inside the containment facility and a dyke outside but adjacent the containment facility.

Some embodiments of the first aspect further comprise a moisture control subsystem, the moisture control subsystem comprising:
   at least one moisture sensor in the at least one biodegradation bed, the at least one moisture sensor configured to detect the moisture level in the at least one biodegradation bed and output a bed moisture level signal representing the bed moisture level;
   a moisture control station for receiving the bed moisture level signal and comparing the bed moisture level against an operating moisture level; and
   the moisture control station for outputting control information to the pump;
   such that if the bed moisture level is greater than the operating moisture level, the pump is directed by the moisture control station to cease pumping the effluent out of the holding tank; and
   such that if the bed moisture level is less than the operating moisture level, the moisture control station allows the pump to continue pumping the effluent out of the holding tank.

In some embodiments, the at least one biodegradation bed is at least two biodegradation beds, the system further comprising:
   a manifold for dividing the line exit into a plurality of line exits, each of the plurality of line exits for directing the effluent to one of the biodegradation beds.

The organic material in the at least one biodegradation bed preferably comprises straw. The microorganisms may comprise microorganisms naturally present in the organic material. Once treated, the treated stream preferably has reduced amounts of the contaminants compared to the effluent.

The excess amounts of the effluent are preferably directed from the at least one biodegradation bed to the sump tank by gravity, and may subsequently be directed from the sump tank to the holding tank by a sump pump situated in the sump tank.

According to a second broad aspect of the present invention, there is provided a method for treating liquid effluent, the effluent comprising contaminants capable of biodegradation, the method comprising the steps of:
a. retaining the effluent within a containment facility;
b. directing the effluent from the containment facility to at least one biodegradation bed outside the containment facility, the at least one biodegradation bed comprising organic material and microorganisms, the organic material and microorganisms suitable for degrading the contaminants in the effluent;
c. allowing the effluent to pass downwardly through the at least one biodegradation bed by gravity;
d. allowing the organic material and microorganisms to degrade the contaminants in the effluent, thereby producing a treated stream;
e. directing the treated stream to a sump tank outside the containment facility; and
f. directing at least a portion of the treated stream from the sump tank back into the containment facility.

In some exemplary embodiments of the second aspect, the effluent comprises rinsate derived from washing agricultural implements. The contaminants may comprise phytosanitary treatment chemicals, surfactants, detergents, oils and/or organics. The containment facility preferably comprises containment features selected from the group consisting of a dyke inside the containment facility and a dyke outside but adjacent the containment facility.

In some exemplary embodiment, the step of directing the effluent from the containment facility to at least one biodegradation bed comprises pumping the effluent. Exemplary methods may further comprise: selecting an operating moisture level for the at least one biodegradation bed; sensing a bed moisture level in the at least one biodegradation bed; comparing the bed moisture level against the operating moisture level; ceasing directing the effluent to the at least one biodegradation bed if the bed moisture level is greater than the operating moisture level; and allowing the directing of the effluent to the at least one biodegradation bed if the bed moisture level is less than the operating moisture level.

In embodiments where the at least one biodegradation bed is at least two biodegradation beds, the method preferably further comprises directing the effluent to each of the biodegradation beds. The organic material in the at least one biodegradation bed preferably comprises straw, and the microorganisms may comprise microorganisms naturally present in the organic material. The step of degrading the contaminants preferably comprises microbial biodegradation. Upon completion, the treated stream preferably has reduced amounts of the contaminants compared to the effluent.

The treated stream may directed to the sump tank by gravity, and at least a portion of the treated stream is directed from the sump tank back into the containment facility by a sump pump.

According to a third broad aspect of the present invention, there is provided a system for treating liquid effluent, the effluent comprising contaminants capable of biodegradation, the system comprising:
a tank intake line for feeding the effluent to a holding tank;
a tank outlet line for removing the effluent from the holding tank;
a pump on the tank outlet line for pumping the effluent out of the holding tank;
a line exit at a terminal end of the tank outlet line;
at least one biodegradation bed situated beneath the line exit, the at least one biodegradation bed configured for receipt of the effluent from the line exit, the at least one biodegradation bed comprising organic material and microorganisms, the organic material and microorganisms suitable for degrading the contaminants in the effluent as the effluent passes downwardly through the at least one biodegradation bed by gravity, thereby producing a treated stream;
a bed outlet line for removing the treated stream from the at least one biodegradation bed; and
a substantially transparent cover for the at least one biodegradation bed, the substantially transparent cover configured to avoid ambient precipitation entry into the at least one biodegradation bed and suitable for allowing sunlight to pass therethrough and assist in evaporation of the effluent in the at least one biodegradation bed.

In some exemplary embodiments of the third aspect, the effluent comprises rinsate derived from washing agricultural implements, and the contaminants may comprise phytosanitary treatment chemicals, surfactants, detergents, oils and/or organics. Exemplary system preferably further comprise a moisture control subsystem, the moisture control subsystem comprising: at least one moisture sensor in the at least one biodegradation bed, the at least one moisture sensor configured to detect the moisture level in the at least one biodegradation bed and output a bed moisture level signal representing the bed moisture level; a moisture control station for receiving the bed moisture level signal and comparing the bed moisture level against an operating moisture level; and the moisture control station for outputting control information to the pump; such that if the bed moisture level is greater than the operating moisture level, the pump is directed by the moisture control station to cease pumping the effluent out of the holding tank; and such that if the bed moisture level is less than the operating moisture level, the moisture control station allows the pump to continue pumping the effluent out of the holding tank.

In some embodiments where the at least one biodegradation bed is at least two biodegradation beds, the system further comprises a manifold for dividing the line exit into a plurality of line exits, each of the plurality of line exits for directing the effluent to one of the biodegradation beds.

The organic material in the at least one biodegradation bed preferably comprises straw, and the microorganisms may comprise microorganisms naturally present in the organic material. Upon completion, the treated stream preferably has reduced amounts of the contaminants compared to the effluent.

In some exemplary embodiments the substantially transparent cover is composed of a clear plastic, which in some preferred embodiments may be Plexiglas™.

According to a fourth broad aspect of the present invention, there is provided a method for treating liquid effluent, the effluent comprising contaminants capable of biodegradation, the method comprising the steps of:
a. retaining the effluent;
b. directing the effluent to at least one biodegradation bed, the at least one biodegradation bed comprising organic material and microorganisms, the organic material and microorganisms suitable for degrading the contaminants in the effluent, the at least one biodegradation bed comprising a substantially transparent cover;
c. allowing the effluent to pass downwardly through the at least one biodegradation bed by gravity;
d. allowing sunlight to pass through the substantially transparent cover and heat the organic material and microorganisms and the effluent; and e. allowing the organic material and microorganisms to degrade the contaminants in the effluent, thereby producing a treated stream.

In some exemplary embodiments of the fourth aspect, the effluent comprises rinsate derived from washing agricultural implements, and the contaminants may comprise phytosanitary treatment chemicals, surfactants, detergents, oils and/or organics. The step of directing the effluent to the at least one biodegradation bed may comprise pumping the effluent.

Some exemplary methods further comprise: selecting an operating moisture level for the at least one biodegradation bed; sensing a bed moisture level in the at least one biodegradation bed; comparing the bed moisture level against the operating moisture level; ceasing directing the effluent to the at least one biodegradation bed if the bed moisture level is greater than the operating moisture level; and allowing the directing of the effluent to the at least one biodegradation bed if the bed moisture level is less than the operating moisture level.

Where the at least one biodegradation bed is at least two biodegradation beds, the method preferably further comprises directing the effluent to each of the biodegradation beds. The organic material in the at least one biodegradation bed preferably comprises straw, and the microorganisms may comprise microorganisms naturally present in the organic material. The step of degrading the contaminants preferably comprises microbial biodegradation, and the treated stream preferably has reduced amounts of the contaminants compared to the effluent.

A detailed description of exemplary embodiments of the present invention is given in the following. It is to be understood, however, that the invention is not to be construed as being limited to these embodiments. The exemplary embodiments are directed to a particular application of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the invention to the precise form of any exemplary embodiment. Accordingly, the description and drawings are to be regarded in an illustrative, rather than a restrictive, sense.

Figure 1:
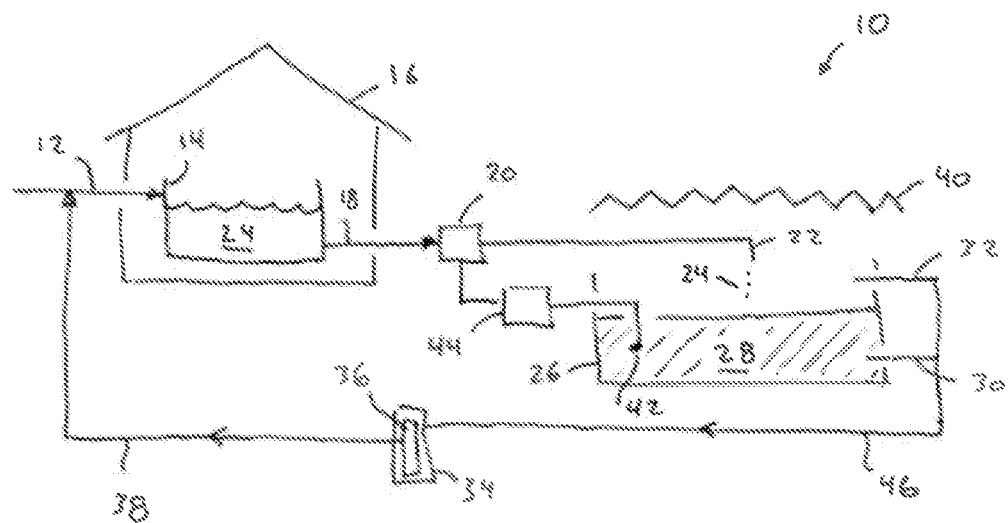
FIG. 1 is a simplified schematic view of a system according to a first embodiment of the present invention, comprising a single biodegradation bed.

Turning to FIG. 1, a first exemplary embodiment of the present invention is illustrated. In this first embodiment, a system 10 is shown that includes a single biodegradation bed 26. Effluent or rinsate 24 is introduced into a holding tank 14 by means of a tank intake line 12. The holding tank 14 is housed within a containment facility 16, which containment facility 16 may be provided with any number of containment measures known to those skilled in the art, but which preferably include one or more dykes inside the containment facility and/or one or more dykes outside but adjacent the containment facility, where such dyke capacity would be at least the maximum volume of the holding tank 14. By housing the holding tank 14 in the containment facility 16, any leak or release of effluent 24 will be contained within the containment facility 16 and not reach the soil and groundwater system adjacent the washing facility.

The effluent/rinsate 24 can be extracted from the holding tank 14 by means of a tank outlet line 18, the effluent 24 drawn through the line 18 by operation of a pump 20. The pump may be of any suitable design or horsepower, which a person skilled in the art could select for a specific system and desired throughput. For one non-limiting example, the pump 20 could be an EcoPlus™ pump, 230½ hp, 1500 gph. The pump 20 operates to pump the effluent 24 through a line exit 22 adjacent the biodegradation bed 26, to introduce the effluent 24 by means of drip irrigation.

The effluent 24 is to be treated in the biodegradation bed 26, which bed 26 comprises a tank for holding a mixture 28 of soil, organic material such as straw, and microorganisms. The soil may be readily available topsoil having properties amenable to microorganism activity in the judgment of the skilled person, and microorganisms suitable for biodegradation of the contaminants may be naturally present in such soil or the organic material introduced therein. The microorganisms present in the bed contents 28 operate to degrade contaminants in the effluent 24, such as those mentioned herein, by a known process termed microbial biodegradation, in which the microorganisms are activated through the heat and moisture conditions of the bed 26 to degrade the contaminants.

However, the effectiveness of the degradation is impacted by the moisture within the bed, given that excess moisture can generate an anaerobic environment that could hinder action of the microorganisms and the desired contaminant degradation. To monitor and control moisture within the bed 26, the system 10 includes a moisture control station or panel 44, which is wired or wirelessly connected to a moisture sensor 42 positioned within the bed contents 28. The station 44 may be, for example, a Baseline 3200 Smart Controller, and the sensor may be a Baseline soil moisture senor, with a Baseline pump start relay, all manufactured by Baseline Inc. The station 44 receives signals from the sensor 42 indicating the moisture level within the bed contents 28. If the station 44 receives a signal from the sensor 42 indicating that the bed moisture is above a certain predetermined operating moisture level—which indicates that anaerobic conditions are approaching—then the station 44 sends a signal to the pump 20 to cease pumping effluent 24 out of the holding tank 14.

In a further means for controlling bed moisture and avoiding anaerobic conditions within the bed 26, the bed 26 is provided with both a bed outlet line 30 and an overflow line 32. While the bed outlet line 30 functions to allow the release of unevaporated treated effluent, it can further operate to allow the release of excess effluent that has passed downwardly through the bed contents 28. In addition, if an undesired high volume of effluent passes into the bed 26, some of that excess may exit the bed 26 by means of the overflow line 32. Both the bed outlet line 30 and the overflow line 32 connect to a sump feed line 46, and pass into a sump tank 34, thus draining the bed 26 of undesired moisture.

The sump tank 34 is positioned outside the containment facility 16, and it contains a sump pump 36. The sump pump 36 may be, for example, a Bur Can ½ hp submersible 1500 gph pump. In the illustrated embodiment, once the sump tank 34 is filled to a certain predetermined level, the sump pump 36 initiates operation and pumps the received fluid through the sump outlet line 38 and into the tank inlet line 12, thus allowing the fluid to be reintroduced into the holding tank 14 for further processing when the bed 26 is dry enough for further effluent 24 introduction.

As can be seen in FIG. 1, the bed 26 is overlain by a cover 40, which in the exemplary embodiment is intended to be positioned a few inches above the bed 26 to allow air flow beneath the cover 40 to enhance evaporation of water in the effluent 24. Covers are known in the art for preventing undesired ambient precipitation to enter the biobeds, and they are primarily of metal composition, but the cover 40 according to some embodiments of the present invention is generally transparent. For one non-limiting example, the cover 40 could be composed of a clear plastic such as Plexiglas™. Heat of the bed contents 28 assists in the degradation process by enhancing microbial activity and evaporating water in the effluent 24 (thus allowing processing of additional effluent 24). By using a clear cover 40, embodiments of the present invention can allow sunlight to pass through the cover 40 and heat the bed contents 28.

Figure 2:
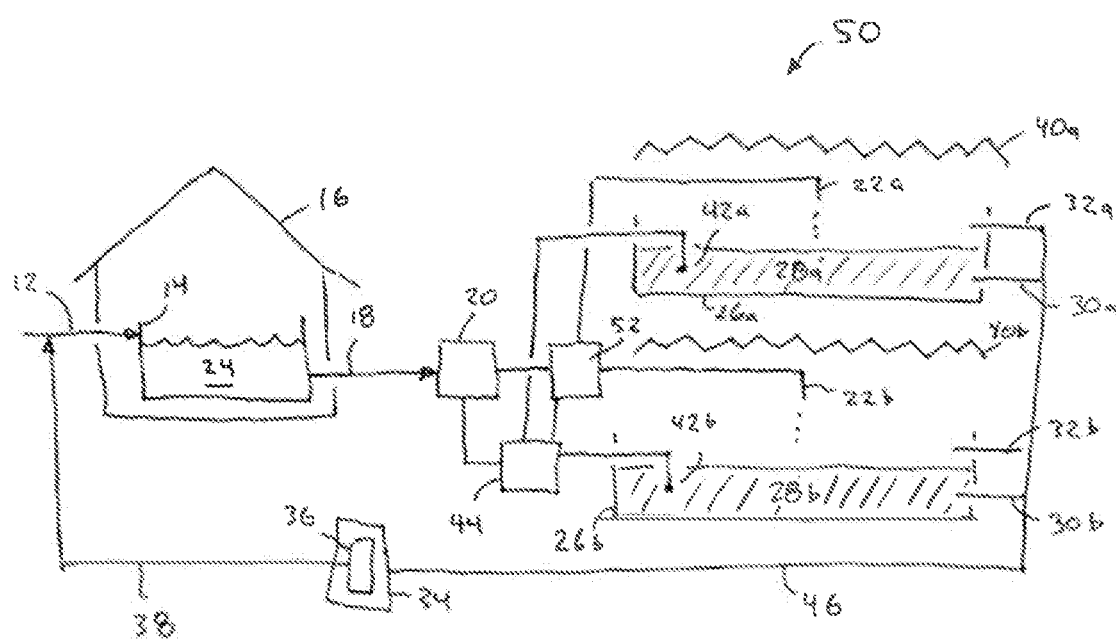
FIG. 2 is a simplified schematic view of a system according to a second embodiment of the present invention, comprising two biodegradation beds.

Turning to FIG. 2, a second exemplary embodiment is illustrated in which two degradation beds 26*a,b* are shown, in a system 50. It will be clear to those skilled in the art given the within teaching that further beds 26 could be included in variant systems. In the embodiment of FIG. 2, the system 50 comprises two beds 26, which are illustrated as vertically stacked but it will be clear that they could be in any arrangement. Similar to the system 10 of FIG. 1 and operative in the same manner, the system 50 comprises two line exits 22*a,b*, biodegradation beds 26*a,b*, bed contents 28*a,b*, bed outlet lines 30*a,b*, overflow lines 32*a,b*, covers 40*a,b*, and moisture sensors 42*a,b*. Unlike the embodiment of FIG. 1, the system 50 further comprises a manifold 52 that controls passage of effluent 24 therethrough to each of the line exits 22*a,b*, which manifold 52 is in electronic communication with the moisture control station 44.

Each of the sensors 42*a,b* sends a signal to the station 44, indicating the moisture level in their respective beds 26*a,b*. The station 44 compares each moisture level against the predetermined operating moisture level and determines if additional effluent 24 introduction should be halted. If the station 44 determines that the moisture level is too high, the station 44 sends a signal to the manifold 52 instructing it to close off supply to one or both (as the case may be) of the line exits 22*a,b*. In this way, the pump 20 may remain operative but supply to the beds 26*a,b* may be managed independently.

Figure 3:
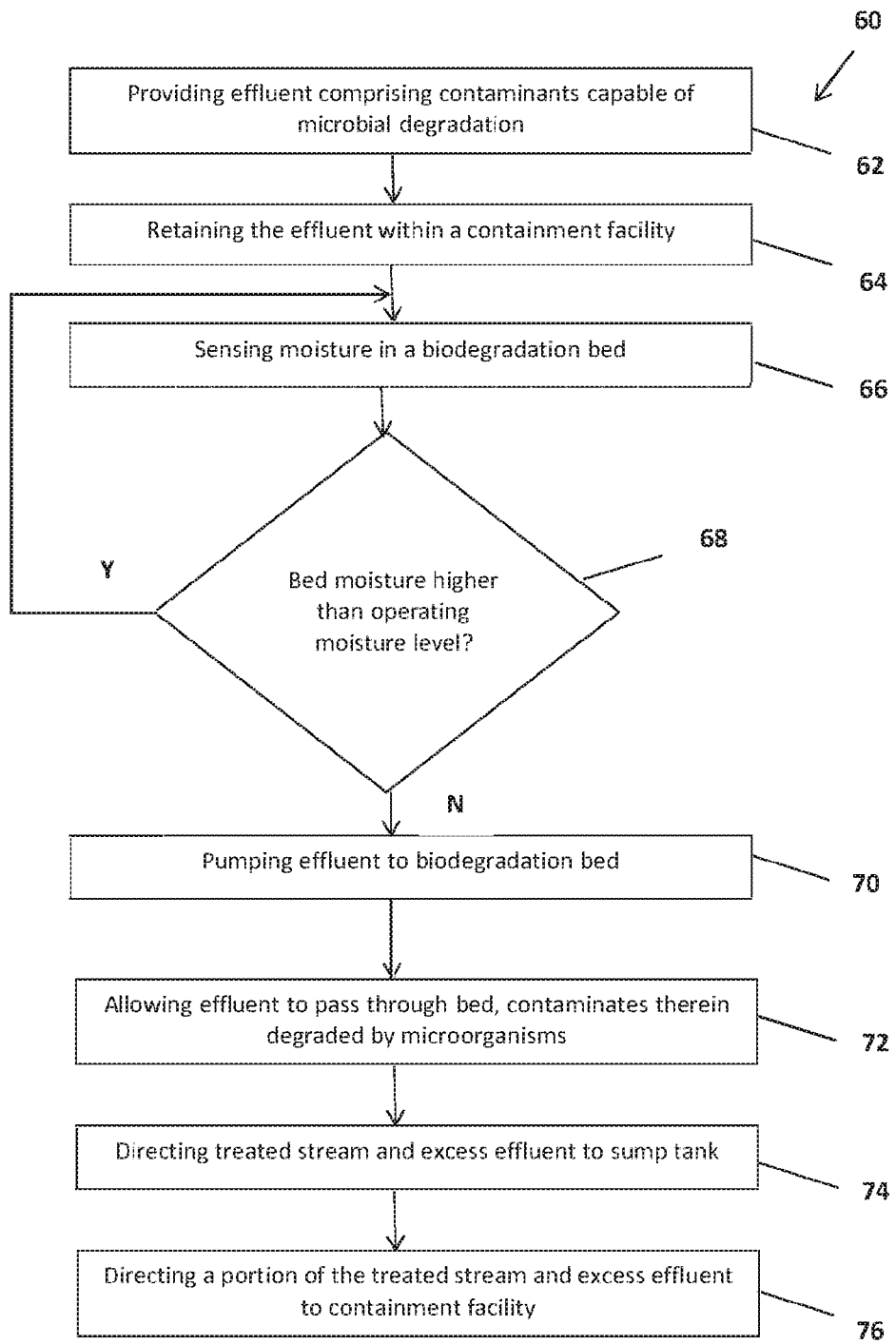
FIG. 3 is a flow chart illustrating a first exemplary method according to the present invention.

Turning now to FIG. 3, a first exemplary method 60 according to the present invention is illustrated by means of a flowchart. The method 60 begins with the step 62 of providing effluent comprising contaminants capable of microbial degradation. As indicated above, degradation would be effected by microorganisms suitable for the specific contaminants such as organic pesticides and selected accordingly by the skilled person, which may include microorganisms naturally present in the organic material. With the effluent retained in a containment facility at step 64, the moisture of the degradation bed is sensed at step 66. As described above, degradation would be negatively impacted by an anaerobic reaction environment, and so this step allows for monitoring of the bed moisture in order to select an effective time to introduce effluent to the bed. At step 68 an assessment is made as to whether the bed moisture is greater than the predetermined operating moisture level, as described above. If the bed moisture is greater, monitoring continues at step 66.

If the bed moisture is lower than the predetermined operating moisture level, effluent is pumped to the bed at step 70 for degradation. At step 72 of the method 60, the effluent is allowed to pass downwardly through the bed contents, such that the contaminants are placed into contact with the microorganisms that will degrade them through a process of microbial biodegradation. The treated stream, which is at least partially decontaminated, and any excess effluent that has been allowed to bypass the treatment (as described above), is directed to a sump tank for holding at step 74. At least a portion of this stream is subsequently directed to the containment facility at step 76.

Figure 4:
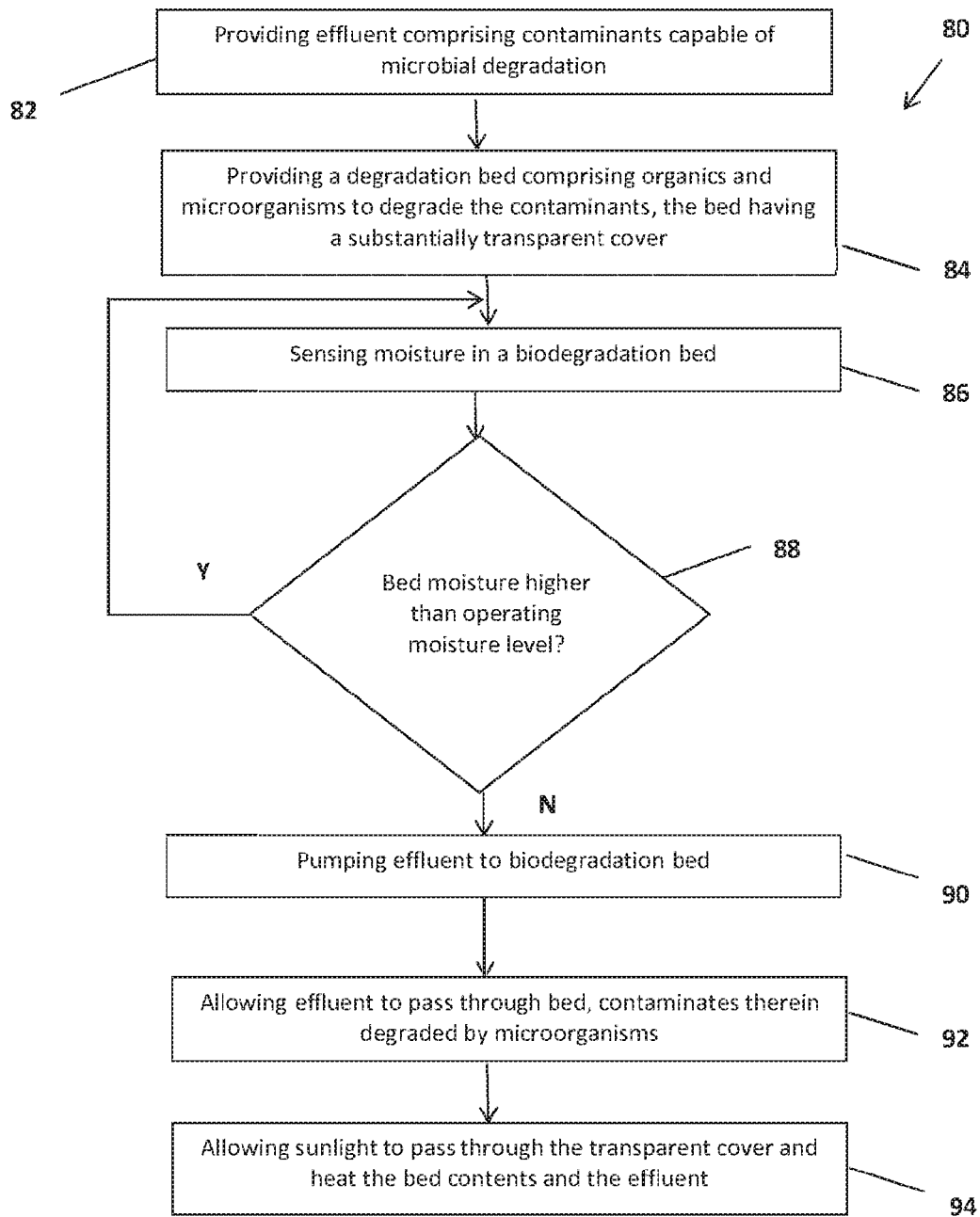
FIG. 4 is a flow chart illustrating a second exemplary method according to the present invention.

Turning now to FIG. 4, a second exemplary method 80 is illustrated. The method 80 begins with the step 82 of providing effluent comprising contaminants capable of microbial degradation, and providing a degradation bed at step 84 comprising organics and microorganisms to degrade the contaminants, the bed having a substantially transparent cover.

The moisture of the degradation bed is sensed at step 86, as degradation would be negatively impacted by an anaerobic reaction environment. At step 88 an assessment is made as to whether the bed moisture is greater than the predetermined operating moisture level, and if the bed moisture is greater then monitoring continues at step 86.

If the bed moisture is lower than the predetermined operating moisture level, effluent is pumped to the bed at step 90 for degradation. At step 92 the effluent is allowed to pass downwardly through the bed contents, such that the contaminants are placed into contact with the microorganisms that will degrade them through a process of microbial biodegradation. At step 94, given the presence of a transparent cover, sunlight is allowed to pass through the cover and heat the bed contents and the effluent.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A system for treating liquid effluent, the effluent comprising contaminants capable of biodegradation, the system comprising:
   a tank intake line for feeding the effluent to a holding tank;
   a containment facility for housing the holding tank;
   a tank outlet line for removing the effluent from the holding tank;
   a pump on the tank outlet line for pumping the effluent out of the holding tank;
   a line exit at a terminal end of the tank outlet line, the line exit positioned outside the containment facility;
   at least one biodegradation bed situated beneath the line exit and outside and beneath the containment facility, the at least one biodegradation bed configured for receipt of the effluent from the line exit, the at least one biodegradation bed comprising organic material and microorganisms, the organic material and microorganisms suitable for degrading the contaminants in the effluent as the effluent passes downwardly through the at least one biodegradation bed by gravity, thereby producing a treated stream;
   a bed outlet line for removing the treated stream from the at least one biodegradation bed;
   an overflow line, connected to the top of the biodegradation bed, for removing excess amounts of the effluent from the at least one biodegradation bed and directing the excess amounts to a sump tank positioned outside the containment facility; and
   an excess amounts reintroduction line for directing at least a portion of the excess amounts from the sump tank to the holding tank,
   and wherein the effluent comprises rinsate derived from washing agricultural implements.

2. The system of claim 1 wherein the contaminants comprise phytosanitary treatment chemicals, surfactants, detergents, oils and/or organics.

3. The system of claim 1 wherein the containment facility comprises containment features selected from the group consisting of a dyke inside the containment facility and a dyke outside but adjacent the containment facility.

4. The system of claim 1 further comprising a moisture control subsystem, the moisture control subsystem comprising:
   at least one moisture sensor in the at least one biodegradation bed, the at least one moisture sensor configured to detect the moisture level in the at least one biodegradation bed and output a bed moisture level signal representing the bed moisture level;
   a moisture control station for receiving the bed moisture level signal and comparing the bed moisture level against an operating moisture level; and
   the moisture control station for outputting control information to the pump;
   such that if the bed moisture level is greater than the operating moisture level, the pump is directed by the moisture control station to cease pumping the effluent out of the holding tank; and
   such that if the bed moisture level is less than the operating moisture level, the moisture control station allows the pump to continue pumping the effluent out of the holding tank.

5. The system of claim 1 wherein the at least one biodegradation bed is at least two biodegradation beds, the system further comprising:
   a manifold for dividing the line exit into a plurality of line exits, each of the plurality of line exits for directing the effluent to one of the biodegradation beds.

6. The system of claim 1 wherein the organic material in the at least one biodegradation bed comprises straw.

7. The system of claim 1 wherein the microorganisms comprise microorganisms naturally present in the organic material.

8. The system of claim 1 wherein the treated stream has reduced amounts of the contaminants compared to the effluent.

9. The system of claim 1 wherein the excess amounts are directed from the at least one biodegradation bed to the sump tank by gravity.

10. The system of claim 1 wherein the excess amounts are directed from the sump tank to the holding tank by a sump pump situated in the sump tank.

* * * * *